United States Patent
Lathrop et al.

(10) Patent No.: US 7,531,919 B2
(45) Date of Patent: May 12, 2009

(54) MULTIPLE GENERATOR LOADCENTER AND METHOD OF DISTRIBUTING POWER FROM MULTIPLE GENERATORS

(75) Inventors: Todd M. Lathrop, Oakdale, PA (US); Jonathan A. Wehrli, Arden, NC (US)

(73) Assignee: Eaton Corporation, Cleveland, OH (US)

(*) Notice: Subject to any disclaimer, the term of this patent is extended or adjusted under 35 U.S.C. 154(b) by 218 days.

(21) Appl. No.: 11/738,832

(22) Filed: Apr. 23, 2007

(65) Prior Publication Data

US 2008/0258557 A1  Oct. 23, 2008

(51) Int. Cl.
*H02J 9/00* (2006.01)

(52) U.S. Cl. ............................................. 307/65
(58) Field of Classification Search .......... 307/65, 307/64
See application file for complete search history.

(56) References Cited

U.S. PATENT DOCUMENTS

| | | | |
|---|---|---|---|
| 4,672,227 A | 6/1987 | Lagree et al. | |
| 4,747,061 A | 5/1988 | Lagree et al. | |
| 4,791,255 A | 12/1988 | Elilezer | |
| 4,894,796 A | 1/1990 | Engel et al. | |
| 5,397,868 A | 3/1995 | Smith et al. | |
| 5,604,421 A * | 2/1997 | Barnsley | 322/22 |
| 5,638,295 A | 6/1997 | Lagree et al. | |
| 6,563,233 B1 * | 5/2003 | Hinks | 307/64 |
| 6,577,216 B2 | 6/2003 | Turner et al. | |
| 6,590,481 B2 | 7/2003 | Turner et al. | |
| 6,680,547 B1 * | 1/2004 | Dailey | 307/31 |
| 6,801,109 B2 | 10/2004 | Simms | |
| 6,813,525 B2 * | 11/2004 | Reid et al. | 700/19 |
| 6,849,967 B2 | 2/2005 | Lathrop et al. | |
| 6,861,930 B2 | 3/2005 | Simms et al. | |
| 6,995,327 B1 | 2/2006 | Shepstone et al. | |
| 7,356,384 B2 * | 4/2008 | Gull et al. | 700/295 |
| 2004/0199297 A1 | 10/2004 | Schaper et al. | |
| 2006/0028069 A1 | 2/2006 | Loucks et al. | |
| 2006/0129798 A1 | 6/2006 | Bance et al. | |

* cited by examiner

*Primary Examiner*—Albert W Paladini
*Assistant Examiner*—Michael Rutland Wallis
(74) *Attorney, Agent, or Firm*—Martin J. Moran

(57) ABSTRACT

A loadcenter supplies power to a non-critical load, a critical load and an ultra-critical load, and is capable of isolating a first distribution panel distributing power to the non-critical load from a second distribution panel distributing power to the critical load to enable the isolated distribution panels to be supplied with power from separate generator power sources in response to power supplied by a utility power source to both distribution panels becoming unacceptable. A third distribution panel distributes power to the ultra-critical load and is selectively supplied with alternating current (AC) power from either the second distribution panel, when the second distribution panel has AC power, or from AC power generated from direct current (DC) power stored in a battery when the second distribution panel lacks AC power.

22 Claims, 8 Drawing Sheets

MULTIPLE GENERATOR LOADCENTER AND METHOD OF DISTRIBUTING POWER FROM MULTIPLE GENERATORS

CROSS-REFERENCE TO RELATED APPLICATION

This application is related to commonly assigned, concurrently filed: U.S. patent application Ser. No. 11/738,830, filed Apr. 23, 2007, entitled "Multiple Generator Loadcenter and Method of Distributing Power from Multiple Generators".

BACKGROUND OF THE INVENTION

1. Field of the Invention

This invention pertains generally to loadcenters and, more particularly, to loadcenters accommodating critical loads and non-critical loads being supplied with power from separate generators in response to power from a utility service becoming unacceptable. This invention also relates to methods of distributing power from separate generators to critical loads and non-critical loads.

2. Background Information

Loadcenters incorporating a multitude of circuit breakers to provide a safe and controllable distribution of electrical power have become a common feature in both residential and commercial structures. Increasingly, such loadcenters are utilized in installations that incorporate an electric generator as a second power source in the event that a utility service serving as a first power source fails or becomes unreliable.

With technological progress resulting in ever more uses for electricity, the amount of electrical power required for both residential and commercial structures has steadily increased, and this had lead to increased demand for relatively larger electric generators. Unfortunately, relatively larger electric generators present various disadvantages over relatively smaller electric generators. While smaller electric generators are typically air cooled, larger electric generators typically require a liquid cooling system with a circulation pump and radiator, thereby adding to both the costs and complexities of operating and maintaining a larger generator in comparison to a smaller generator. Larger generators also require relatively larger quantities of maintenance fluids, including lubrication oil and coolant liquid.

Given the disadvantages of larger generators in comparison to smaller generators, there has been interest in combining multiple smaller generators to do the work of a larger generator. However, combining the output of multiple generators is hampered by the AC outputs of independent generators often being out of phase. Known techniques for combining such unsynchronized supplies of power into a single supply of power with acceptable alternating current (AC) characteristics are both cumbersome and expensive.

Technological progress has also spurred a growing use of uninterruptible power supply (UPS) units in both residential and smaller scale commercial structures to provide reliable electric power for doctor's offices away from hospitals, home-based businesses and home-based chronic patient care support. Unfortunately, typical commercially available uninterruptible power supplies are standalone device that are typically placed directly in rooms where they are needed, and are not designed to coordinate their operation of providing uninterrupted power to ultra-critical loads with the operation of electric generators to most efficiently ensure the provision of electric power to different loads of differing priority.

SUMMARY OF THE INVENTION

These needs and others are met by embodiments of the invention providing a loadcenter having the ability to isolate two or more distribution panels to accommodate a distribution panel of critical loads and a distribution panel of non-critical loads being supplied with power from separate generators. The loadcenter may further accommodate an additional distribution panel of ultra-critical loads supplied with power from a generator or from the battery of an uninterruptible power supply when generator power is unavailable.

In accordance with one aspect of the invention, a loadcenter is for a first power source having a first status, a second power source having a second status, a third power source having a third status, a battery having a fourth status, a non-critical load, a critical load, and an ultra-critical load. The loadcenter comprises a first distribution panel having a first circuit breaker to selectively receive power from the first power source, a second distribution panel having a second circuit breaker to selectively receive power from the second power source, a third distribution panel, a third circuit breaker to selectively supply power from the third power source to the first distribution panel, a fourth circuit breaker to selectively supply power from the first distribution panel to the non-critical load, a fifth circuit breaker to selectively supply power from the second distribution panel to the critical load; a sixth circuit breaker to selectively supply power from the third distribution panel to the ultra-critical load, a first circuit isolator to selectively supply power from the first distribution panel to the second distribution panel, an uninterruptible power supply circuit structured to selectively receive power from one of the battery and the second distribution panel and to supply power to the third distribution panel, and a controller structured to monitor at least the second status and the third status. In response to the second power source being unacceptable and the third power source being unacceptable, the controller is further structured to open the third circuit breaker, open the second circuit breaker, close the first circuit isolator, and close the first circuit breaker.

In accordance with another aspect of the invention, a loadcenter is for a first power source having a first status, a second power source having a second status, a third power source having a third status, a fourth power source having a fourth status, a fifth power source having a fifth status, a first non-critical load, a second non-critical load, a first critical load and a second critical load. The loadcenter comprises a first distribution panel having a first circuit breaker to selectively receive power from the first power source, a second distribution panel having a second circuit breaker to selectively receive power from the second power source, a third distribution panel having a third circuit breaker to selectively receive power from the third power source, a fourth distribution panel having a fourth circuit breaker to selectively receive power from the second power source, a fifth circuit breaker to selectively supply power from the fifth power source to the first distribution panel, a first circuit isolator to selectively supply power from the first distribution panel to the second distribution panel, a second circuit isolator to selectively supply power from the first distribution panel to the third distribution panel, a third circuit isolator to selectively supply power from the third distribution panel to the fourth distribution panel, a sixth circuit breaker to selectively supply power from the first distribution panel to the first non-critical load, a seventh circuit breaker to selectively supply power from the second distribution panel to the first critical load, an eighth circuit breaker to selectively supply power from the third distribution panel to the second non-critical load, a ninth circuit breaker to selectively supply power from the fourth distribution panel to the second critical load, a controller structured to monitor at least the first status, the third status and the fifth status. In response to the third power source being unacceptable and the fifth power source being unacceptable, being further structured to open the fifth circuit breaker, open the third circuit breaker, close the first circuit breaker, and close the second circuit isolator.

In accordance with another aspect of the invention, a loadcenter is for a first power source having a first status, a second power source having a second status, a third power source having a third status, a fourth power source having a fourth status, a fifth power source having a fifth status, a first battery having a sixth status, a second battery having a seventh status, a first non-critical load, a second non-critical load, a first critical load, a second critical load, a first ultra-critical load and a second ultra-critical load. The loadcenter comprises a first distribution panel having a first circuit breaker to selectively receive power from the first power source, a second distribution panel having a second circuit breaker to selectively receive power from the second power source, a third distribution panel having a third circuit breaker to selectively receive power from the third power source, a fourth distribution panel having a fourth circuit breaker to selectively receive power from the fourth power source, a fifth distribution panel, a sixth distribution panel, a fifth circuit breaker to selectively supply power from the fifth power source to the first distribution panel, a first circuit isolator to selectively supply power from the first distribution panel to the second distribution panel, a second circuit isolator to selectively supply power from the first distribution panel to the third distribution panel, a third circuit isolator to selectively supply power from the third distribution panel to the fourth distribution panel, a sixth circuit breaker to selectively supply power from the first distribution panel to the first non-critical load, a seventh circuit breaker to selectively supply power from the second distribution panel to the first critical load, an eighth circuit breaker to selectively supply power from the third distribution panel to the second non-critical load, a ninth circuit breaker to selectively supply power from the fourth distribution panel to the second critical load, a tenth circuit breaker to selectively supply power from the fifth distribution panel to the first ultra-critical load, an eleventh circuit breaker to selectively supply power from the sixth distribution panel to the second ultra-critical load, a first uninterruptible power supply circuit structured to selectively receive power from one of the first battery and the second distribution panel and to supply power to the fifth distribution panel, a second uninterruptible power supply circuit structured to selectively receive power from one of the second battery and the fourth distribution panel and to supply power to the sixth distribution panel; and a controller structured to monitor at least the second status and the fifth status. In response to the second power source being unacceptable and the fifth power source being unacceptable, being further structured to open the fifth circuit breaker, open the second circuit breaker, close the first circuit isolator; and close the first circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
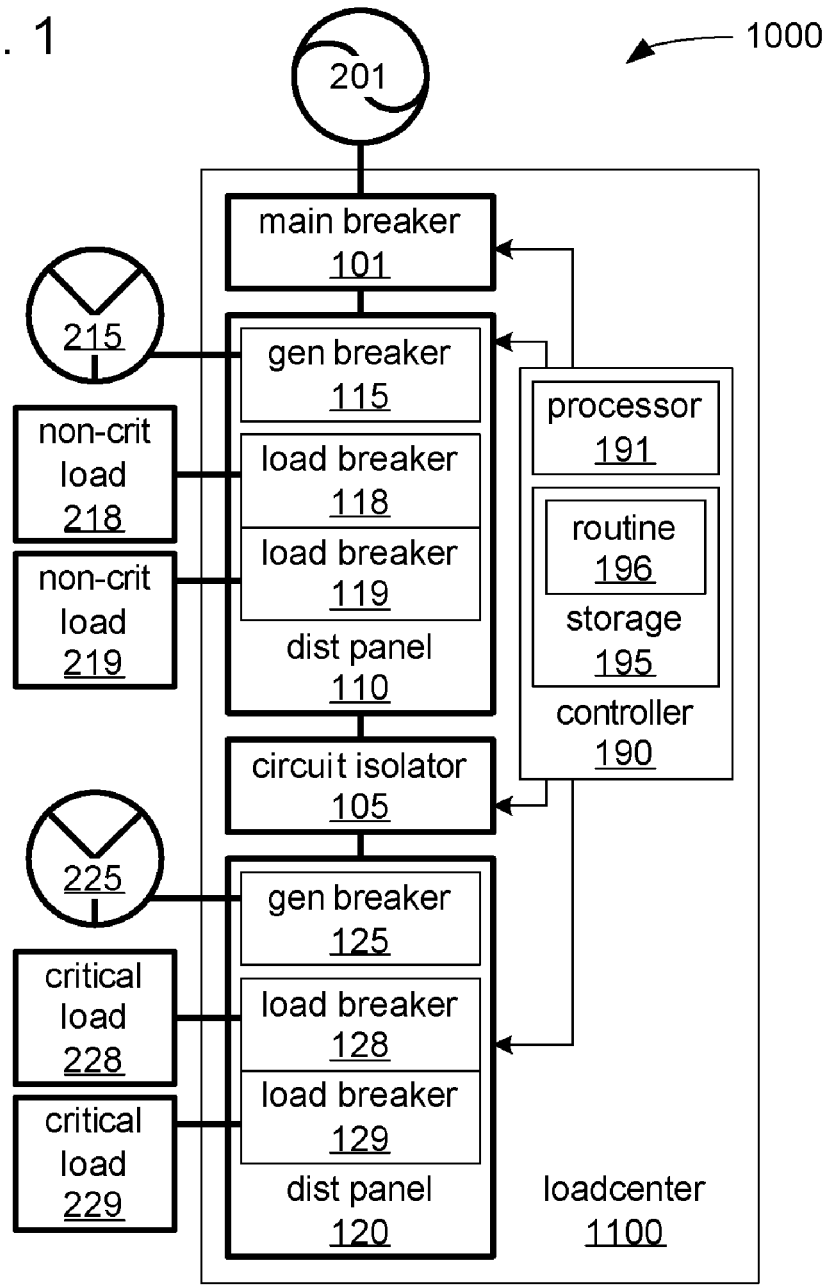
FIG. 1 is a block diagram of a loadcenter installation in accordance with embodiments of the invention.

Referring to FIG. 1, a loadcenter installation 1000 to selectively provide electrical power to non-critical and critical loads (e.g., non-critical loads 218-219 and critical loads 228-229 depicted in FIG. 1) from multiple alternate sources incorporates generator power sources 215 and 225, and a loadcenter 1100 distributing electric power, at various times, from one or both of the generator power sources 215 and 225, or from a utility power source (e.g., utility power source 201 depicted in FIG. 1) to one or more non-critical and critical loads. As will be explained, the loadcenter 1100 normally distributes power received from the utility power source 201, unless the utility power source 201 becomes unacceptable, in which case, the loadcenter 1100 distributes power from one or both of the generator power sources 215 and 225. The non-critical loads 218-219 and the critical loads 228-229 represent one or more electrical devices within, for example, a commercial or residential structure (not shown) that require electric power, such as for example and without limitation, lighting, plug-ins, appliances, commercial machinery and climate control systems. The critical loads 228-229 differ from the non-critical loads 218-219 in that the critical loads 228-229 are given priority in the distribution of power where there is insufficient power to supply both the non-critical loads 218-219 and the critical loads 228-229. The utility power source 201 is a source of electric power from a commercial vendor (e.g., without limitation, a connection to an electrical grid maintained by a utility power company).

The generator power sources 215 and 225 are, for example, electric generators of a type commonly found near the exterior of a commercial or residential structure to provide a backup source of electric power to that structure in the event that the electric power supplied by the utility power source 201 becomes unstable (as in the case of a brownout) or fails, entirely. The generator power sources 215 and 225 may be any of a wide variety of electric generators based on any of a variety of technologies, including but not limited to, solar energy, wind energy, geothermal energy, or fossil fuel energy through either a fuel cell or an internal combustion engine. In preferred practice, the generator power sources 215 and 225 are relatively smaller electric generators of relatively simpler design, such as and without limitation, electric generators based on relatively smaller internal combustion engines lending themselves to the use of air cooling (versus the greater complexity of a liquid cooling system) and/or a simpler piston stroke configuration.

The loadcenter 1100 incorporates a main breaker 101, distribution panels 110 and 120, a circuit isolator 105, and a controller 190. The distribution panel 110 incorporates a generator breaker 115 and load breakers 118-119. Similarly, the distribution panel 120 incorporates a generator breaker 125 and load breakers 128-129. Electric power from the utility power source 201 is routed via one or more conductors to the main breaker 101, and is routed through the main breaker 101 to the distribution panel 110 when the main breaker 101 is closed. Electric power from the generator power source 215 is routed via one or more conductors to the generator breaker 115 of the distribution panel 110, and is routed through the generator breaker 115 to the distribution panel 110 when the generator breaker 115 is closed. Similarly, electric power from the generator power source 225 is routed via one or more conductors to the generator breaker 125 of the distribution panel 120, and is routed through the generator breaker 125 to the distribution panel 120 when the generator breaker 125 is closed. Electric power from the distribution panel 110 is routed through the circuit isolator 105 to the distribution panel 120 when the circuit isolator 105 is closed. Electric power supplied to the distribution panel 110 is routed from the distribution panel 110 to one or more of the non-critical loads 218-219 when one or more of corresponding ones of the load breakers 118-119 are closed. Similarly, electric power supplied to the distribution panel 120 is routed from the distribution panel 120 to one or more of the critical loads 228-229 when one or more of corresponding ones of the load breakers 128-129 are closed.

Through use of the main breaker 101 and the generator breaker 115, the distribution panel 110 may be supplied with power from either the utility power source 201 or the generator power source 215, and in some embodiments, the main breaker 101 and the generator breaker 115 may be interlocked to prevent both from being closed, simultaneously. Similarly, through the use of the circuit isolator 105 and the generator breaker 125, the distribution panel 120 may be supplied with power from either the distribution panel 110 or the generator power source 225, and in some embodiments, the circuit isolator 105 and the generator breaker 125 may be interlocked to prevent both from being closed simultaneously. Further, through use of one or more of the load breakers 118-119, power from the distribution panel 110 may be disconnected from one or more of corresponding ones of the non-critical loads 218-219. The main breaker 101, the generator breaker 115, the circuit isolator 105 and the generator breaker 125 are operated by the controller 190 to coordinate the selection and supply of power to the distribution panels 110 and 120. At least the load breakers 118-119 are also operated by the controller 190 to coordinate the disconnection of one or more of the non-critical loads 218-219 with the selection and supply of power to the distribution panels 110 and 120 in instances where the supply of power is relatively limited.

As those skilled in the art will readily recognize, the main breaker 101, the generator breakers 115 and 125, and the load breakers 118-119 and 128-129 may be any of a wide variety of devices or combinations of devices providing both protection against too great a flow of current and service disconnect capability. A widely known and very common form of device employed as a service disconnect is a circuit breaker. Circuit breakers commonly provide a manual operating handle by which disconnection can be effected, and/or a shunt trip (e.g., a magnetic coil that when energized by an external power source causes the circuit breaker to enter an open state). Widely known and commonly used combinations of devices also serving as service disconnects are a fuse and either a latching relay or latching contactor where disconnection is caused by breaking the circuit conveying power for latching.

As those skilled in the art will also readily recognize, the circuit isolator 105 may be any of a wide variety of devices or combinations of devices that provide the function of both making and breaking electrical connections for the routing of electric power. For example, it is widely known to use one or more relays and/or contactors as a power disconnect device.

The controller 190 is an automated electronic device that responds to one or more inputs indicating the status of one or more power sources and/or at least one characteristic of the power provided by one or more power sources. Such inputs may include, for example and without limitation, an indication of the input voltage level supplied by one or more of the utility power source 201 and the generator power sources 215 and 225 failing to meet a desired specification (e.g., without limitation, failing to stay within 5% of a standard 115V level), or an indication of the amount of current being drawn from one or more of these power sources failing to stay within a predetermined level (e.g., without limitation, failing to stay below 80%, 90% or 100% of the maximum current capacity of a conductor or power source). The controller 190 may also monitor one or more aspects of the operating status of one or both of the generator power sources 215 and 225, such as without limitation, the amount of available fuel remaining. In some embodiments, where current drawn from one or more of the utility power source 201 and the generator power sources 215 and 225, a fuel level, or other characteristic or input is monitored, the predetermined level at which the controller 190 may taken a given action may be programmable by an operator or installer of the loadcenter 1100 or of the installation 1000.

The main breaker 101 and the circuit isolator 105 are normally operated by the controller 190 to be closed to route power from the utility power source 201 to both of the distribution panels 110 and 120, and the generator breakers 115 and 125 are normally operated by the controller 190 to be open to disconnect any power that may be provided by the generator power sources 215 and 225. However, when the electric power supplied by the utility power source 201 becomes unstable or fails, the controller 190 operates the main breaker 101, the generator breakers 115 and 125, and the circuit isolator 105 to disconnect power from the utility power source 201 and to supply power from one or both of the generator power sources 215 and 225 to one or both of the distribution panels 110 and 120. Priority is given to supplying electric power to the critical loads 228-229, and so the controller 190 may additionally operate the load breakers 118-119 to shed one or more of the non-critical loads 218-219 from power supplied to the distribution panel 110 if there is insufficient electric power to serve both the non-critical loads 218-219 and the critical loads 228-229.

During such normal operation in which the utility power source 201 supplies power to both of the distribution panels 110 and 120, the controller 190 may also be provided with the ability to implement one or more requirements of a safety standard, such as and without limitation, Article 702 of the 2008 National Electric Code promulgated by National Fire Protection Association. More specifically, the controller 190 may signal one or more of the load breakers 118-119 and/or 128-129 to shed one or more of the non-critical loads 218-219 and/or one or more of the critical loads 228-229 in response to detecting a possible unsafe condition. In some embodiments, the controller 190 may be designed to be provided with data concerning a limitation in current capacity of the utility power source 201, one or both of the distribution panels 110 and 120, or one or more other components conveying power to or within the installation 1000. Such data may, for example and without limitation, be provided to the controller 190 by an operator or installer of the installation 1000 or the loadcenter 1100, or may be provided to the controller 190 at the time of fabrication of the loadcenter 1100. In such embodiments, the controller 190 monitors the flow of current to or within the installation 1000 to determine when to cause load shedding in response to a current flow reaching a predetermined level.

Preferably, given that the critical loads 228-229 are meant to be given higher priority than the non-critical loads 218-219, the controller 190 would, at least initially, shed one or more of the non-critical loads 218-219 before shedding any of the critical loads 228-229.

Where the utility power source 201 has become unreliable, and where both the generator power sources 215 and 225 are able to supply power to the distribution panels 110 and 120, respectively, the controller 190 arranges for power from the utility power source 201 to be disconnected, for the distribution panels 110 and 120 to be isolated from each other, and for the generator power sources 215 and 225 to separately supply power to the distribution panels 110 and 120, respectively. To do this, the controller 190 first operates the main breaker 101 to become open to disconnect the utility power source 201, and operates the circuit isolator 105 to become open to isolate the distribution panels 110 and 120. Then, the controller 190 operates the generator breakers 115 and 125 to become closed to route power from the generator power sources 215 and 225 to the distribution panels 110 and 120, respectively. In this way, the critical loads 228-229 are supplied with power from the generator power source 225 and the non-critical loads 218-219 are supplied with power from the generator power source 215. In some embodiments, the controller 190 may additionally operate one or more of the load breakers 118-119 to shed one or more of the non-critical loads 218-219 where the current drawn by the non-critical loads 218-219 exceeds the capacity of the generator power source 215. Similarly, the controller 190 may operate one or more of the load breakers 128-129 to shed one or more of the critical loads 228-229 where the current drawn by the critical loads 228-229 exceeds the capacity of the generator power source 225.

Where the utility power source 201 has become unreliable, and where the generator power source 225 is able to supply power, but the generator power source 215 is not, the controller 190 arranges for power from the utility power source 201 to be disconnected, and for the generator power source 225 to supply power to the distribution panel 120. To do this, the controller 190 first operates the main breaker 101 to become open to disconnect the utility power source 201. Then, the controller 190 operates the generator breaker 125 to become closed to route power from the generator power source 225 to the distribution panel 120. Where the generator power source 225 is a relatively small electric generator, and therefore, unlikely to be able to supply sufficient electric power to power both the critical loads 228-229 and the non-critical loads 218-219, the controller 190 may either operate one or more of the load breakers 118-119 to shed one or more of the non-critical loads 218-219, or may operate the circuit isolator 105 to isolate the distribution panels 110 and 120. Alternatively, the controller 190 may allow the main breaker 101 to remain closed, and instead, operate the circuit isolator 105 to become open and then operate the generator breaker 125 to become closed. In this way, at least the critical loads 228-229 are supplied with power from the generator power supply 225. As previously discussed, the controller 190 may operate one or more of the load breakers 128-129 to shed one or more of the critical loads 228-229 where the current drawn by the critical loads 228-229 exceeds the capacity of the generator power source 225.

Where the utility power source 201 has become unreliable, and where the generator power source 215 is able to supply power, but the generator power source 225 is not, the controller 190 arranges for power from the utility power source 201 to be disconnected, for the distribution panels 110 and 120 to remain connected, and for the generator power source 215 to supply power to the distribution panel 120 through the distribution panel 110. To do this, the controller 190 first operates the main breaker 101 to become open to disconnect the utility power source 201, and if the generator breaker 125 is closed, the controller 190 operates the generator breaker 125 to also become open to disconnect the generator power source 225. Also, if the circuit isolator 105 is open, the controller 190 operates the circuit isolator 105 to become closed to connect the distribution panels 110 and 120. Further, the controller 190 operates the generator breaker 115 to become closed to route power from the generator power source 215 to the distribution panel 110, which in turn, is routed to the distribution panel 120 through the circuit isolator 105. Where the generator power source 215 is a relatively small electric generator, and therefore, unlikely to be able to supply sufficient electric power to power both the critical loads 228-229 and the non-critical loads 218-219, the controller 190 may operate one or more of the load breakers 118-119 to shed one or more of the non-critical loads 218-219. In this way, at least the critical loads 228-229 are supplied with power from the generator power supply 215.

During such occasions where the generator power source 215 is required to supply power to both of the distribution panels 110 and 120, the controller 190 may also be provided with the ability to selectively shed varying ones or varying quantities of the non-critical loads 218-219 in response to an indication from the controller 190 of a need to do so. A preselected quantity of the load breakers 118-119 or specifically preselected ones of the load breakers 118-119 may be operated by the controller 190 to become open, thereby shedding corresponding ones of the non-critical loads 218-219 in response to the generator power source being used to supply power to both distribution panels 110 and 120. Alternatively, the shedding of different ones of the non-critical loads 218-219 by the controller 190 may be in response to the amount of power being drawn by the critical loads 228-229. Further, the controller 190 may operate one or more of the load breakers 128-129 to shed one or more of the critical loads 228-229 in addition to shedding the non-critical loads 218-219 where the current drawn by the critical loads 228-229 exceeds the capacity of the generator power source 215, even with the non-critical loads 218-219 having been shed.

The controller 190 may also be provided with the ability to turn one or both of the generator power sources 215 and 225 on or off. The controller 190 may respond to instability or complete loss of power from the utility power source 201 by signaling one or both of the generator power sources 215 and 225 to turn on to provide power. The controller 190 may further signal the generator power sources 215 and 225 to turn off when stable power is once again being supplied by the utility power source 201. The controller 190 may also signal one or both of the generator power sources 215 and 225 to turn on or to turn off in response to aspects of their operating status, including without limitation, restricting the number of times one or both of the generator power sources 215 and 225 are started to conserve starting battery power, or restricting the amount of time that one or both of the generator power sources 215 and 225 are operated to conserve fuel.

In some embodiments, the controller 190 may incorporate a processor 191 coupled to a storage 195. The processor 191 may be any of a variety of types of processing device, including, for example, a specialized processor such as a DSP or microcontroller, or a more general function processor such as a processor executing the widely known and used "X86" instruction set. The storage 195 is a machine readable storage device that may be made up of volatile and/or non-volatile forms of storage devices including, but not limited to, RAM, ROM, FLASH, EPROM, and magnetic and/or optical machine readable media, that may or may not be of a removable form.

The storage carries a control routine 196 incorporating a sequence of instructions that when executed by the processor, causes the processor 191 to operate the main breaker 101, the circuit isolator 105 and the generator breakers 115 and 125 in the manner that has been described. In such embodiments, characteristics of one or both of the generator power sources 215 and 225 may also be stored in the storage 195 and be employed by the control routine 196 in determining whether or not to shed one or more of the non-critical loads 218-219. By way of example, where the generator power source 215 must supply power to both of the distribution panels 110 and 120, the amount of power drawn by the critical loads 228-229 may be monitored and compared to a known power output capacity of the generator power source 215, and one or more of the non-critical loads 218-219 may be shed in response to the outcome of that comparison.

Figure 2:
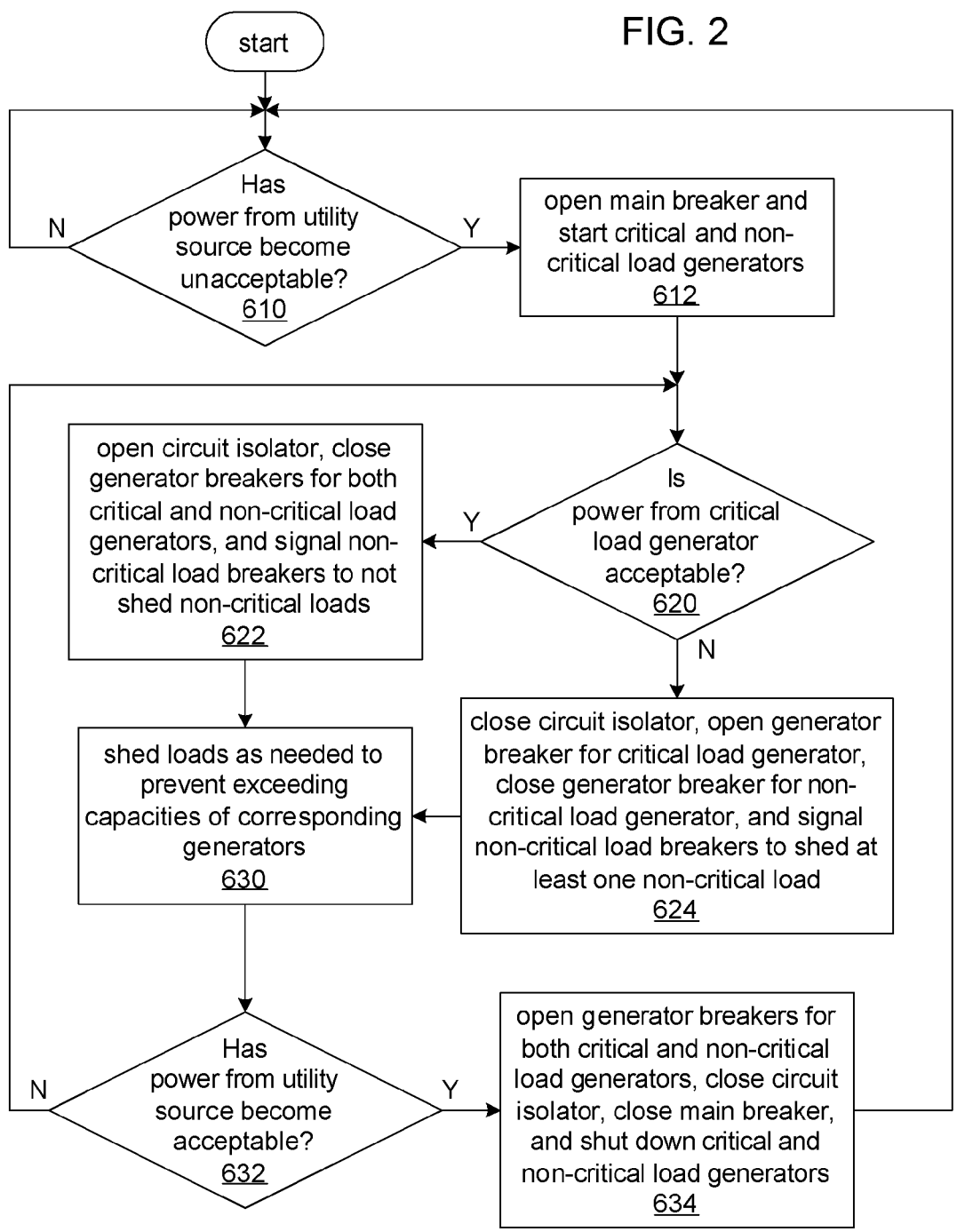
FIG. 2 is a flowchart of isolating distribution panels and providing separate distribution panels with power from separate generators in accordance with another embodiment of the invention.

FIG. 2 shows a procedure for supplying power to a critical load. At 610, the power from a utility power source is repeatedly checked to determine if it has become unacceptable. If so, then at 612, the main breaker by which power from the utility power source is routed to a first distribution panel supplying power to non-critical loads is opened, and an attempt is made to start separate generator power sources, a non-critical load generator for the first distribution panel and a critical load generator for a second distribution panel supplying power to critical loads.

If at 620, there is acceptable power supplied by the critical load generator, then at 622, a circuit isolator capable of isolating the first and second distribution panels is opened, generator breakers routing power from each of the non-critical load and critical load generators to the first and second distribution panels, respectively, are closed, and non-critical load circuit breakers routing power from the first distribution panel to non-critical loads are signaled to not shed the non-critical loads. At 630, loads provided with power by either the non-critical load or critical load generators may be shed, as needed, to prevent the output capacity of either the non-critical load or critical load generators from being exceeded (e.g., when reaching a predetermined level for the specific one of the generators).

However, if at 620, there is no acceptable power supplied by the critical load generator, then at 624, the circuit isolator is closed, the generator breaker routing power from the critical generator to the second distribution panel is opened, the generator breaker routing power from the non-critical generator to the first distribution panel is closed, and at least one of the non-critical load circuit breakers is signaled to shed at least one non-critical load in response to the non-critical generator having to supply power to both the first and second distribution panels. At 630, loads provided with power by the non-critical load generator may be shed as needed to prevent the output capacity of the non-critical load generator from being exceeded which may be determined by monitoring whether or not a predetermined level for the non-critical load generator is reached.

If at 632, the power from the utility power source has not yet become acceptable, then a check of the power from the critical load generator is again made at 620. However, if at 632, the power from the utility power source has become acceptable, then at 634, both generator breakers are opened, the circuit isolator is closed, the main breaker is closed, and both generator power sources are signaled to shut down. Then, the power from the utility power source is again checked at 610.

Figure 3:
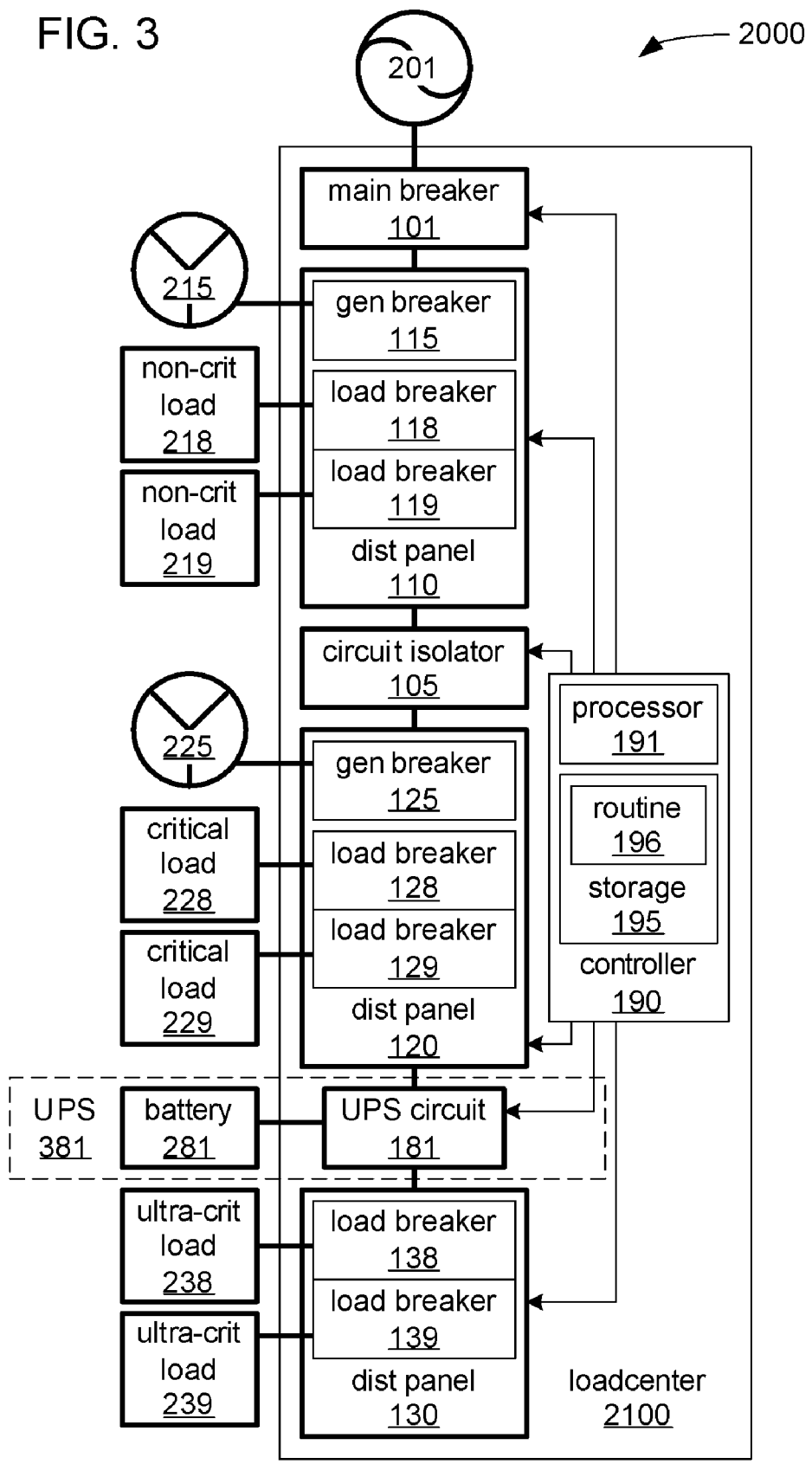
FIG. 3 is a block diagram of another loadcenter installation in accordance with embodiments of the invention.

Referring to FIG. 3, a loadcenter installation 2000 incorporating a loadcenter 2100, not unlike the installation 1000 and the loadcenter 1100 of FIG. 1, selectively provides electrical power to the non-critical loads 218-219 and the critical loads 228-229 from the generator power sources 215 and 225, and from the utility power source 201. The installation 2000 and the loadcenter 2100 are substantially similar to the installation 1000 and the loadcenter 1100, respectively, in numerous structural and functional details, and substantially similar structures performing substantially similar functions have been designated with the same reference numerals in both FIGS. 1 and 3. Not unlike the loadcenter 1100, the loadcenter 2100 normally distributes power received from the utility power source 201, unless the utility power source 201 becomes unacceptable, in which case, the loadcenter 2100 distributes power from one or both of the generator power sources 215 and 225. However, unlike the loadcenter 1100, the loadcenter 2100 additionally selectively provides electrical power to ultra-critical loads 238-239 from a battery 281, as well as from the generator power source 215 and 225, and from the utility power source 201. On occasions where electric power is not being provided by either of the generator power sources 215 and 225, and not being provided by the utility power source 201 (such as when the utility power source 201 has failed and neither of the generator power sources 215 and 225 have yet been started), the loadcenter 2100 provides electric power to the ultra-critical loads 238-239 from the battery 281.

Like the loadcenter 1100, the loadcenter 2100 incorporates a main breaker 101, distribution panels 110 and 120, a circuit isolator 105, and a controller 190. However, the loadcenter 2100 additionally incorporates an additional distribution panel 130 and at least an UPS circuit 181 of an uninterruptible power supply 381 that also incorporates the battery 281. It should be noted that although the battery 281 is depicted as not being incorporated within the loadcenter 2100, in alternate embodiments, the battery 281 may also be incorporated within the loadcenter 2100 such that the entirety of the UPS 381 is incorporated within the loadcenter 2100. The distribution panel 130 incorporates load breakers 138-139. Electric power from the distribution panel 120 is routed via one or more conductors to the UPS circuit 181 of the UPS 381, and is routed through the UPS circuit 181 to the distribution panel 130 when the distribution panel 120 is able to provide power. Direct current (DC) electric power from the battery 281 is routed via one or more conductors to the UPS circuit 181, and is routed through the UPS circuit 181 to the distribution panel 130 as alternating current (AC) electric power when the distribution panel 120 is not able to provide power to the UPS circuit 181. Electric power supplied to the distribution panel 130 is routed from the distribution panel 130 to one or more of the ultra-critical loads 238-239 when one or more of corresponding ones of the load breakers 138-139 are closed.

The main breaker 101, the generator breakers 115 and 125, the circuit isolator 105, and/or the UPS circuit 181 are operated by the controller 190 to coordinate the selection and supply of power to the distribution panels 110, 120 and 130. The load breakers 118-119, 128-129 and/or 138-139 are also operated by the controller 190 to coordinate the disconnection of one or more of the non-critical loads 218-219, the critical loads 228-229 and/or the ultra-critical loads 238-239 with the selection and supply of power to the distribution panels 110, 120 and/or 130 in instances where the supply of power is relatively limited. As in the loadcenter 1100, the controller 190 of the loadcenter 2100 is an automated electronic device that responds to one or more inputs indicating the status of one or more power sources and/or at least one characteristic of the power provided by one or more power sources. In addition to previously discussed inputs to the controller 190, such inputs may additionally include an indication of the condition of the battery 181, including available electricity.

As with the loadcenter 1100, in the loadcenter 2100, the main breaker 101 and the circuit isolator 105 are normally operated by the controller 190 to be closed to route power from the utility power source 201 to both of the distribution panels 110 and 120, and the generator breakers 115 and 125 are normally operated by the controller 190 to be open to disconnect any power that may be provided by the generator power sources 215 and 225. However, unlike the loadcenter 1100, in the loadcenter 2100, electric power provided to the distribution panel 120 from the utility power source 201 is also distributed to the UPS circuit 181, and through the UPS circuit 181 to the distribution panel 130. If the electric power supplied by the utility power source 201 becomes unstable or fails, the controller 190 operates the main breaker 101, the generator breakers 115 and 125, and the circuit isolator 105 to disconnect power from the utility power source 201 and to supply power from one or both of the generator power sources 215 and 225 to one or both of the distribution panels 110 and 120. Highest priority is given to supplying electric power to the ultra-critical loads 238-239, with the critical loads 228-229 being next in priority, and the non-critical loads 218-219 being last in priority. In response to various situations, the controller 190 may additionally operate the load breakers 118-119 and/or 128-129 to shed one or more of the non-critical loads 218-219 and/or one or more of the critical loads 228-229 in giving priority to supplying power to the ultra-critical loads 238-239, especially where there is insufficient power for all three of these types of loads. Furthermore, during such normal operation in which the utility power source 201 supplies power to all of the distribution panels 110, 120 and 130, the controller 190 may signal one or more of the load breakers 118-119 and/or 128-129 to shed one or more of the non-critical loads 218-219 and/or one or more of the critical loads 228-229 in response to detecting a possible unsafe condition.

Where the utility power source 201 has become unreliable, and where both the generator power sources 215 and 225 are used to separately supply power to the distribution panels 110 and 120 in the manner discussed, earlier, the UPS circuit 181 initially switches from receiving AC power from the distribution panel 120 to receiving DC power from the battery 281. After the generator power source 225 has been started and is supplying power to the distribution panel 120, the UPS circuit 181 may switch back to receiving AC power from the distribution panel 120, and perhaps use that power from the distribution panel 120 to recharge the battery 281. In some embodiments, the controller 190 may operate the UPS circuit 181 to prevent the recharging of the battery 281 from power supplied by the generator power source 225 if the generator power source lacks the capacity to allow for charging the battery 281 and supplying power to whichever ones of the critical loads 228-229 and the ultra-critical loads 238-239 have not been shed. Also, the controller 190 may operate one or more of the load breakers 128-129 and/or 138-139 to shed one or more of the critical loads 228-229 and/or one or more of the ultra-critical loads 238-239 where the generator power source 225 lacks sufficient capacity to supply power to all of those loads.

The UPS circuit 181 responds in a similar manner to the previously discussed situation where the utility power source 201 has become unreliable, and where one of the generator power sources 215 and 225 is able to supply power, but the other of the generator power sources 215 and 225 is not. However, in the situation where the generator power source 215 is employed to supply power to the distribution panel 120 through the distribution panel 110, the controller 190 may operate one or more of the load breakers 118-119 to shed one or more corresponding ones of the non-critical loads 218-219 to aid in ensuring that sufficient power is available for at least the ultra-critical loads 238-239, if not also the critical loads 228-229.

The controller 190 may also be provided with the ability to operate the UPS circuit 181 to turn off all power to the distribution panel 130 in situations where no power is being provided by the utility power source 201 or by either of the generator power sources 215 and 225, and where the battery 281 is depleted to a predetermined level. In some embodiments, the battery voltage of the battery 281 may be monitored for a drop to a predetermined level of battery voltage (e.g., and without limitation, 80%, 90% or other percentage of the battery voltage reached by the battery 281 when fully charged) to determine whether the battery 281 is depleted. Regardless of whether the characteristic monitored is the battery voltage or some other characteristic, in some embodiments, the predetermined level may be programmable by an operator or installer of the loadcenter 2100 or of the installation 2000. During an extended period in which the utility power source 201 continues to be unreliable, the controller 190 may variously turn off one or both of the generator power sources 215 and 225, as well as turn off the UPS circuit 181 where fuel for the generator power sources 215 and 225 has been depleted to a predetermined level, as well as the battery 281 being depleted to a predetermined level.

Figure 4:
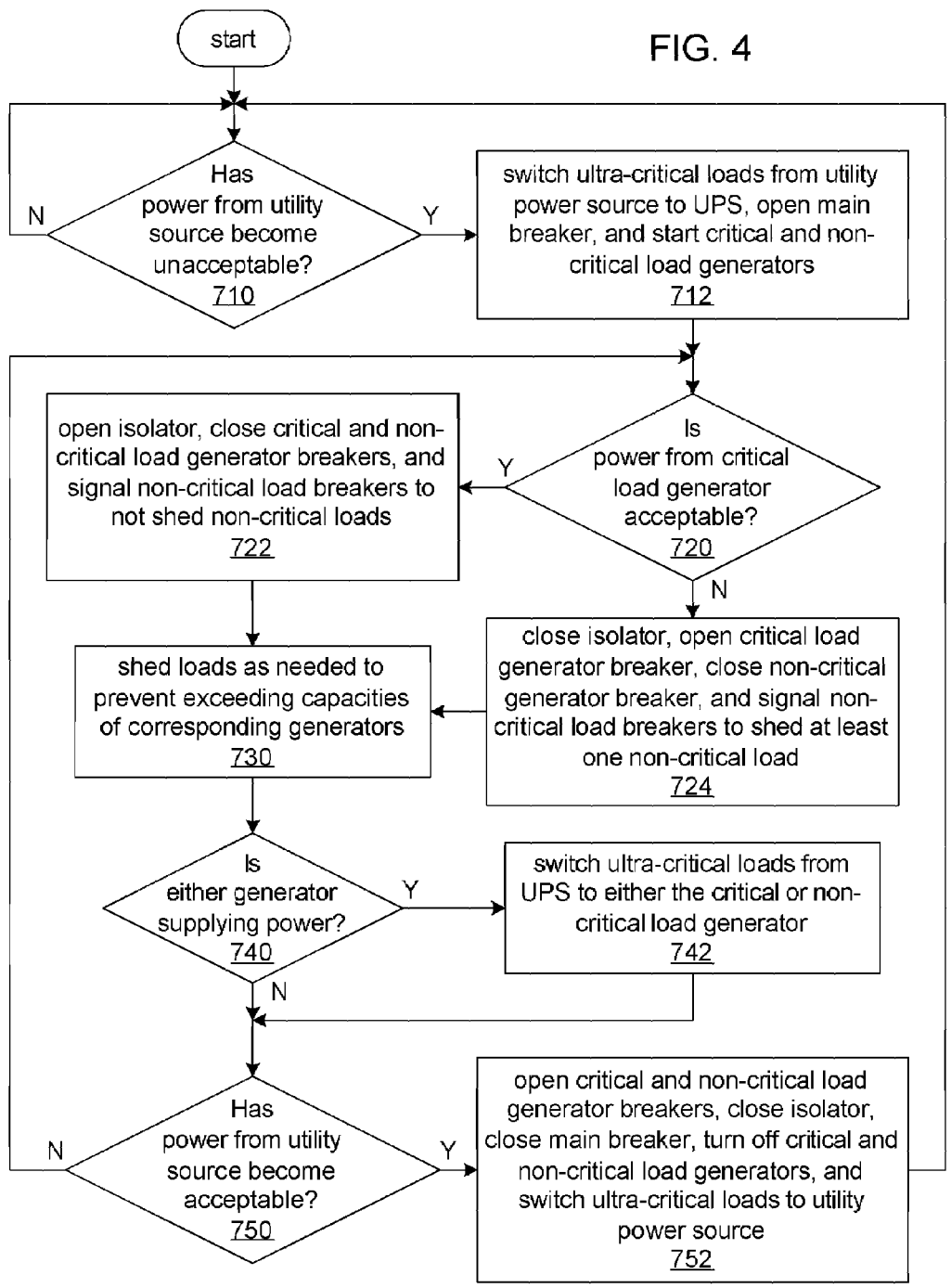
FIG. 4 is another flowchart of isolating distribution panels and providing separate distribution panels with power from separate generators in accordance with another embodiment of the invention.

FIG. 4 shows a procedure for supplying power to a critical load. At 710, the power from a utility power source is repeatedly checked to determine if it has become unacceptable. If so, then at 712, ultra-critical loads are switched from receiving AC power from the utility power source to receiving AC power generated from DC power provided by a battery, the main breaker by which power from the utility power source is routed to a first distribution panel supplying power to non-critical loads is opened, and an attempt is made to start separate generator power sources, including a non-critical load generator for the first distribution panel and a critical load generator for a second distribution panel supplying power to critical loads.

If at 720, there is acceptable power supplied by the critical load generator, then at 722, a circuit isolator capable of isolating the first and second distribution panels is opened, generator breakers routing power from each of the non-critical and critical generators to the first and second distribution panels, respectively, are closed, and non-critical load circuit breakers routing power from the first distribution panel to non-critical loads are signaled to not shed the non-critical loads. At 730, loads provided with power by either the non-critical load or critical load generators may be shed as needed to prevent the output capacity of either the non-critical or critical generators from being exceeded (e.g., when reaching a predetermined level for the specific one of the generators).

However, if at 720, there is no acceptable power supplied by the critical load generator, then at 724, the circuit isolator is closed, the generator breaker routing power from the critical load generator to the second distribution panel is opened, the generator breaker routing power from the non-critical load generator to the first distribution panel is closed, and at least one of the non-critical load circuit breakers is signaled to shed at least one non-critical load in response to the non-critical generator having to supply power to both the first and second distribution panels. At 730, loads provided with power by the non-critical load generator may be shed as needed to prevent the output capacity of the non-critical load generator from being exceeded as may be indicated by a predetermined level for the non-critical load generator being reached.

If at 740, one or the other of the critical load and the non-critical load generators is providing power such that power other than from the battery is available to be supplied to the ultra-critical loads, then at 742, the ultra-critical loads are switched from the AC power generated from the DC power provided by the battery to AC power provided by one or the other of the non-critical load and the critical load generators.

If at 750, the power from the utility power source has not yet become acceptable, then a check of the power from the critical load generator is again made at 720. However, if at 750, the power from the utility power source has become acceptable, then at 752, both generator breakers are opened, the circuit isolator is closed, the main breaker is closed, both generator power sources are signaled to shut down, and the ultra-critical loads are switched to receiving power from the utility power source. Then, the power from the utility power source is again checked at 710.

Figure 5:
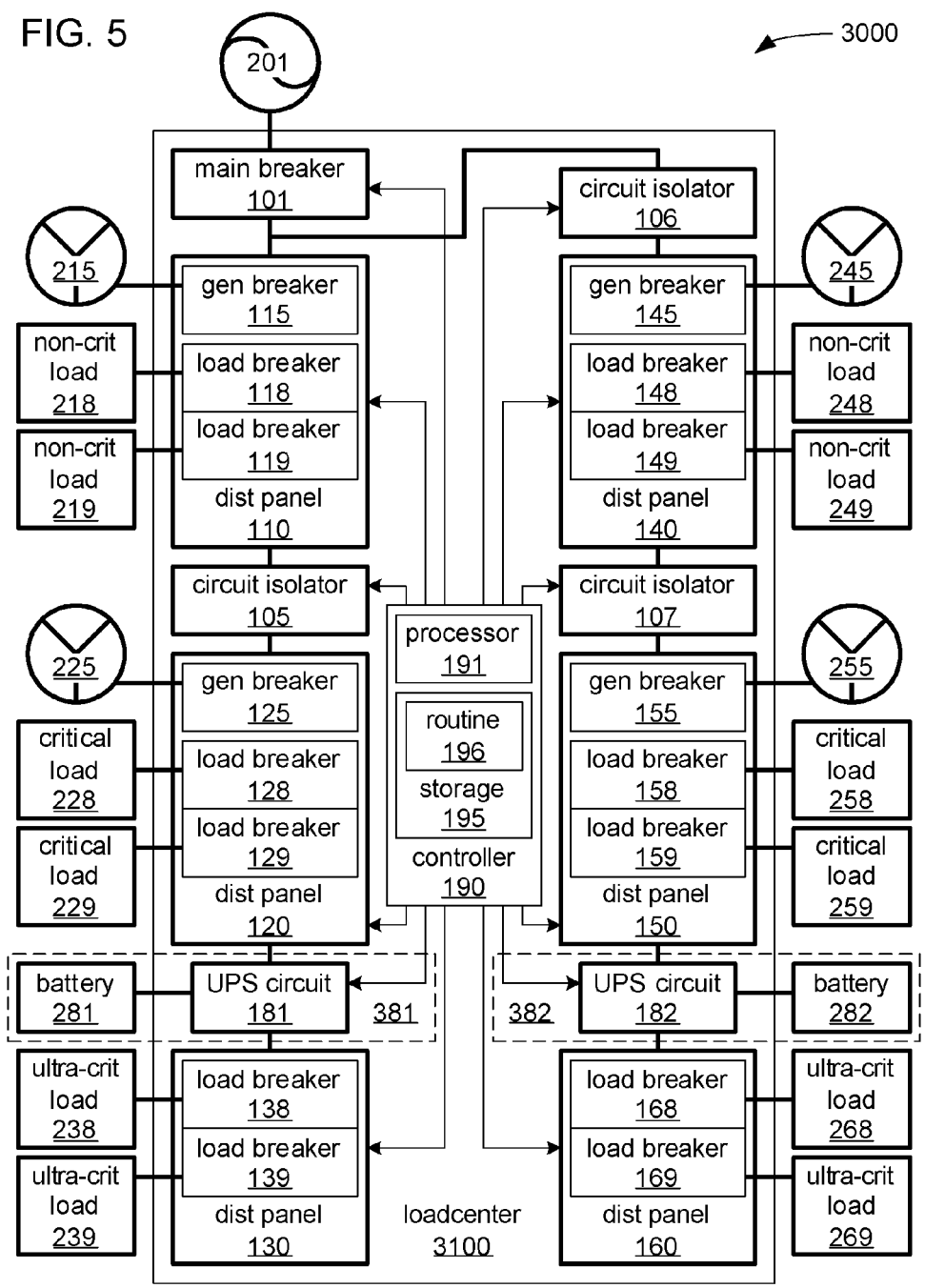
FIG. 5 is a block diagram of still another loadcenter installation in accordance with embodiments of the invention.

Referring to FIG. 5, a loadcenter installation 3000 incorporating a loadcenter 3100, in a manner similar to the afore-described installations and loadcenters, selectively provides electrical power to an assortment of non-critical, critical and ultra-critical loads. The installation 3000 and the loadcenter 3100 are similar to the installation 2000 and the loadcenter 2100, respectively, in numerous structural and functional details, and substantially similar structures performing substantially similar functions have been designated with the same reference numerals in both FIGS. 3 and 5. However, there are some differences, for example, the loadcenter 3100 doubles the number of distribution panels and UPS circuits present in the loadcenter 2100, and for example, the installation 3000 doubles the number of generator power sources and batteries present in the installation 2000. More specifically, the loadcenter 3100 selectively provides power to the non-critical loads 218-219, the critical loads 228-229 and the ultra-critical loads 238-239, like the loadcenter 2100 of FIG. 3. However, the loadcenter 3100 also selectively provides power to non-critical loads 248-249, critical loads 258-259 and ultra-critical loads 268-269. In addition to receiving power from the utility power source 201, the generator power sources 215 and 225, and the battery 281, just as was the case with the loadcenter 2100, the loadcenter 3100 also receives power from additional generator power sources 245 and 255, and from an additional battery 282.

The loadcenter 3100 normally distributes power received from the utility power source 201, unless the utility power source 201 becomes unacceptable, in which case, the loadcenter 3100 distributes power from one or more of the generator power sources 215, 225, 245 and 255, and from one or both of the batteries 281 and 282. On occasions where electric power is not being provided by any of the generator power sources 215, 225, 245 and 255, and not being provided by the utility power source 201 (such as when the utility power source 201 has failed and none of the generator power sources 215, 225, 245 and 255 have yet been started), the loadcenter 2100 provides electric power to the ultra-critical loads 238-239 from the UPS circuit 181 and the battery 281, and to the ultra-critical loads 268-269 from the UPS circuit 182 and the battery 282.

Like the loadcenter 2100, the loadcenter 3100 incorporates a main breaker 101, distribution panels 110, 120 and 130, a circuit isolator 105, at least an UPS circuit 181 of an UPS 381, and a controller 190. However, the loadcenter 3100 also incorporates additional distribution panels 140, 150 and 160, additional circuit isolators 106 and 107, and at least an additional UPS circuit 182 of an UPS 382 that also incorporates the battery 282. It should be noted that not unlike the UPS 381 of the loadcenter 2100, one or both of the UPS 381 and the UPS 382 may be fully incorporated within the loadcenter 3100. The distribution panel 140 incorporates load breakers 148-149 and a generator breaker 145, the distribution panel 150 incorporates load breakers 158-159 and a generator breaker 155, and the distribution panel 160 incorporates load breakers 168-169.

Electric power is routed from the main breaker 101 to the circuit isolator 106 via the same one or more conductors that also route power from the main breaker 101 to the distribution panel 110, and that power is routed through the circuit isolator 106 to the distribution panel 140 when the circuit isolator 106 is closed. Electric power from the generator power source 245 is routed via one or more conductors to the generator breaker 145 of the distribution panel 140, and is routed through the generator breaker 145 to the distribution panel 140 when the generator breaker 145 is closed. Similarly, electric power from the generator power source 255 is routed via one or more conductors to the generator breaker 155 of the distribution panel 150, and is routed through the generator breaker 155 to the distribution panel 150 when the generator breaker 155 is closed. Electric power from the distribution panel 140 is routed through the circuit isolator 107 to the distribution panel 150 when the circuit isolator 107 is closed. Electric power from the distribution panel 150 is routed via one or more conductors to the UPS circuit 182, and is routed through the UPS circuit 182 to the distribution panel 160 when the distribution panel 150 is able to provide power. DC power from the battery 282 is routed via one or more conductors to the UPS circuit 182, and the DC power is converted to AC power that is provided by the UPS circuit 182 to the distribution panel 160 when the distribution panel 150 is not able to provide power to the UPS circuit 182.

The distribution panels 140, 150 and 160 distribute electric power in a manner very much like what has already been described with regard to corresponding ones of the distribution panels 110, 120 and 130. Electric power supplied to the distribution panel 140 is routed from the distribution panel 140 to one or more of the non-critical loads 248-249 when one or more of corresponding ones of the load breakers 148-149 are closed. Similarly, electric power supplied to the distribution panel 150 is routed from the distribution panel 150 to one or more of the critical loads 258-259 when one or more of corresponding ones of the load breakers 158-159 are closed. Further, electric power supplied to the distribution panel 160 is routed from the distribution panel 160 to one or more of the ultra-critical loads 268-269 when one or more of corresponding ones of the load breakers 168-169 are closed.

The main breaker 101, the generator breakers 115, 125, 145 and 155, the circuit isolators 105-107, and/or the UPS circuits 181-182 are operated by the controller 190 to coordinate the selection and supply of power to the distribution panels 110, 120, 130, 140, 150 and 160. The load breakers 118-119, 128-129, 138-139, 148-149, 158-159 and/or 168-169 are also operated by the controller 190 to coordinate the disconnection of one or more of the non-critical loads 218-219 and 248-249, the critical loads 228-229 and 258-259, and/or the ultra-critical loads 238-239 and 268-269 with the selection and supply of power to the distribution panels 110, 120, 130, 140, 150 and/or 160 in instances where the supply of power is relatively limited. As in the loadcenters 1100 and 2100, the controller 190 of the loadcenter 3100 is an automated electronic device that responds to one or more inputs indicating the status of one or more power sources and/or at least one characteristic of the power provided by one or more power sources. In addition to previously discussed inputs to the controller 190, such inputs may additionally include an indication of the condition of the generator power sources 245 and 255, including available fuel, or the battery 182, including available electricity.

In a manner not unlike the loadcenters 1100 and 2100, in the loadcenter 3100, the main breaker 101 and the circuit isolators 105-107 are normally operated by the controller 190 to be closed to route power from the utility power source 201 to the distribution panels 110, 120, 140 and 150, and the generator breakers 115, 125, 145 and 155 are normally operated by the controller 190 to be open to disconnect any power that may be provided by the generator power sources 215, 225, 245 and 255. Also, electric power provided to the distribution panels 120 and 150 from the utility power source 201 is also distributed to the UPS circuits 181 and 182, and through the UPS circuits 181 and 182 to the distribution panels 130 and 160, respectively. If the electric power supplied by the utility power source 201 becomes unstable or fails, the controller 190 operates the main breaker 101, the generator breakers 115, 125, 145 and 155, and the circuit isolators 105-107 to disconnect power from the utility power source 201 and to supply power from one or more of the generator power sources 215, 225, 245 and 255 to one or more of the distribution panels 110, 120, 140 and 150. Highest priority is given to supplying electric power to the ultra-critical loads 238-239 and 268-269, with the critical loads 228-229 and 258-259 being next in priority, and the non-critical loads 218-219 and 248-249 being last in priority. In response to various situations, the controller 190 may additionally operate the load breakers 118-119, 128-129, 148-149 and/or 158-159 to shed one or more of the non-critical loads 218-219 and 248-249 and/or one or more of the critical loads 228-229 and 258-259 in giving priority to supplying power to the ultra-critical loads 238-239 and 268-269, especially where there is insufficient power for all three of these types of loads. Furthermore, during such normal operation in which the utility power source 201 supplies power to all of the distribution panels 110, 120, 130, 140, 150 and 160, the controller 190 may signal one or more of the load breakers 118-119, 128-129, 148-149 and/or 158-159 to shed one or more of the non-critical loads 218-219 and 248-249 and/or one or more of the critical loads 228-229 and 258-259 in response to detecting a possible unsafe condition.

As previously discussed with regard to the loadcenters 1100 and 2100, in the loadcenter 3100, where the utility power source 201 has become unreliable and the generator power source 215 is able to supply power, but the generator power source 225 is not, the controller 190 may open the generator breaker 125 to disconnect the generator power source 225, while closing the circuit isolator 105 to supply power to the distribution panel 120 from the generator power source 215 through the distribution panel 110 and the circuit isolator 105. Similarly, in the loadcenter 3100, where the utility power source has become unreliable and the generator power source 245 is able to supply power, but the generator power source 255 is not, the controller 190 may open the generator breaker 155 to disconnect the generator power source 255, while closing the circuit isolator 107 to supply power to the distribution panel 150 from the generator power source 245 through the distribution panel 140 and the circuit isolator 107. Additionally, where the utility power source 201 has become unreliable and one or the other of the generator power sources 215 and 245 is not able to supply power, the controller 190 may open the corresponding one of the generator breakers 115 and 145, while closing the circuit isolator 106 to allow both of the distribution panels 110 and 140 to be supplied with power from whichever one of the generator power sources 215 and 245 is able to provide power.

Where the utility power source 201 has become unreliable, and where the generator power sources 215, 225, 245 and 255 are used to separately supply power to the distribution panels 110, 120, 140 and 150, respectively, the UPS circuits 181 and 182 initially switch from receiving AC power from the distribution panels 120 and 150 to receiving DC power from the batteries 281 and 282, respectively. After the generator power sources 225 and 255 have been started and are supplying power to the distribution panels 120 and 150, respectively, one or both of the UPS circuits 181 and 182 may switch back to receiving AC power from the distributions panel 120 and 150, respectively, and perhaps use that power to recharge one or both of the batteries 281 and 282. In some embodiments, the controller 190 may operate one or both of the UPS circuits 181 and 182 to prevent battery recharging from power supplied by the corresponding one of the generator power sources 225 and 255 if there is insufficient generator power to allow for battery charging.

Each of the UPS circuits 181 and 182 responds in a similar manner to a situation where the utility power source 201 has become unreliable, and where less than all of the generator power sources 215, 225, 245 and 255 are able to supply power. Where either or both of the distribution panels 120 and 150 are able to provide AC power from a generator power source, either or both of the UPS circuits 181 and 182 may respond by employing some of that power AC to recharge one or both of the batteries 281 and 282. In a situation where the generator power source 215 is employed to supply power to the distribution panel 120 through the distribution panel 110 and circuit isolator 105, the controller 190 may operate one or more of the load breakers 118-119 to shed one or more of the non-critical loads 218-219 to aid in ensuring that sufficient power is available for at least the ultra-critical loads 238-239, if not also the critical loads 228-229. Similarly, in a situation where the generator power source 245 is employed to supply power to the distribution panel 150 through the distribution panel 140 and the circuit isolator 107, the controller 190 may operate one or more of the load breakers 148-149 to shed one or more of the non-critical loads 248-249 to aid in ensuring that sufficient power is available for at least the ultra-critical loads 268-269, if not also the critical loads 258-259.

The controller 190 may also be provided with the ability to operate one or the other of the UPS circuits 181 and 182 to turn off all power to corresponding ones of the distribution panels 130 and 160 in situations where no power is being provided by the utility power source 201, and where the generator power sources 215, 225, 245 and 255 are depleted to a predetermined level (e.g., and without limitation, where fuel available for generating electricity is depleted), along with corresponding ones of the batteries 281 and 282 also being depleted to a predetermined level. The controller 190 may take such steps after an extended period of time in which the utility power source 201 is unreliable.

Figure 6:
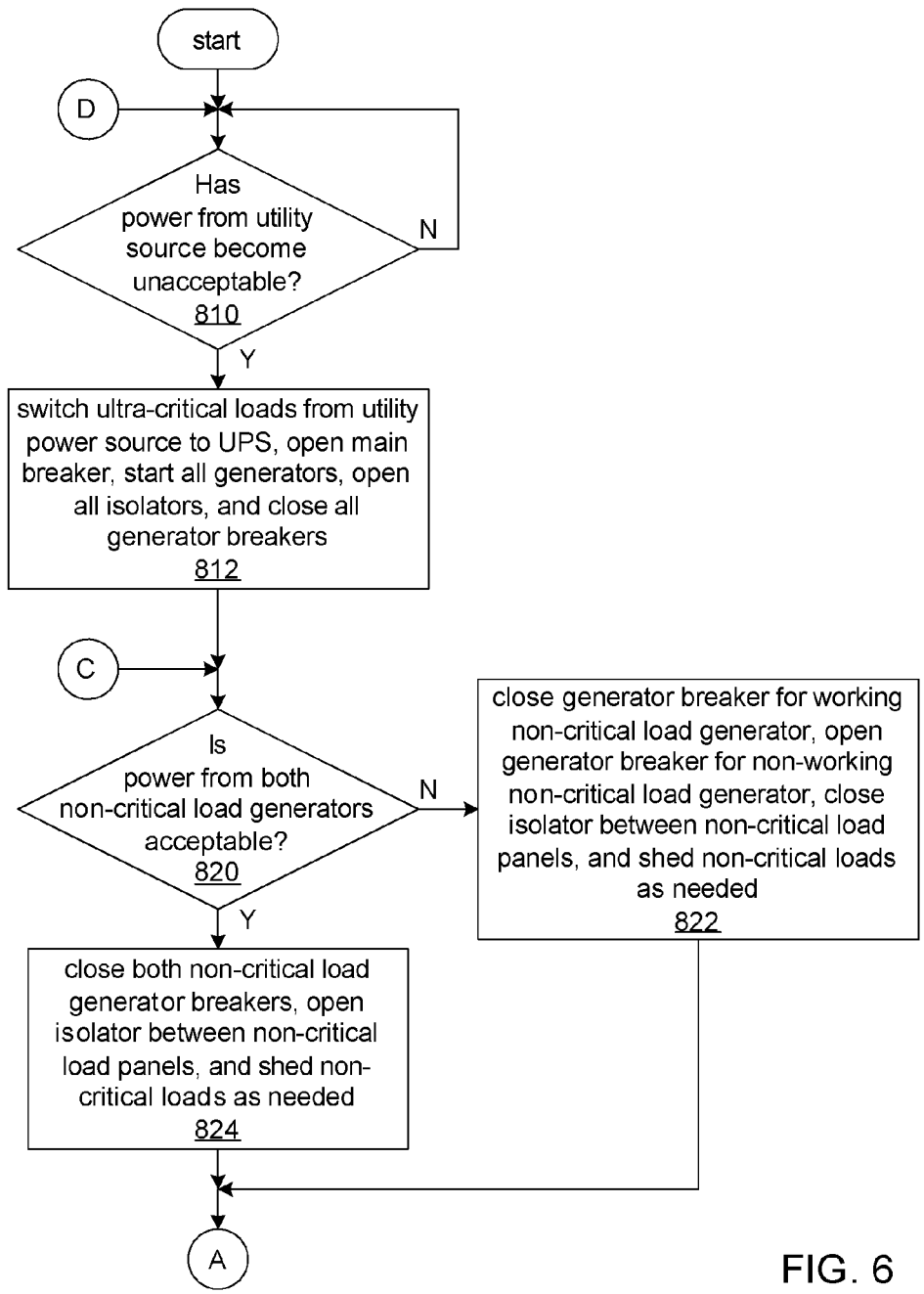
FIGS. 6, 7 and 8, together, provide still another flowchart of isolating distribution panels and providing separate distribution panels with power from separate generators in accordance with another embodiment of the invention.
Figure 7:
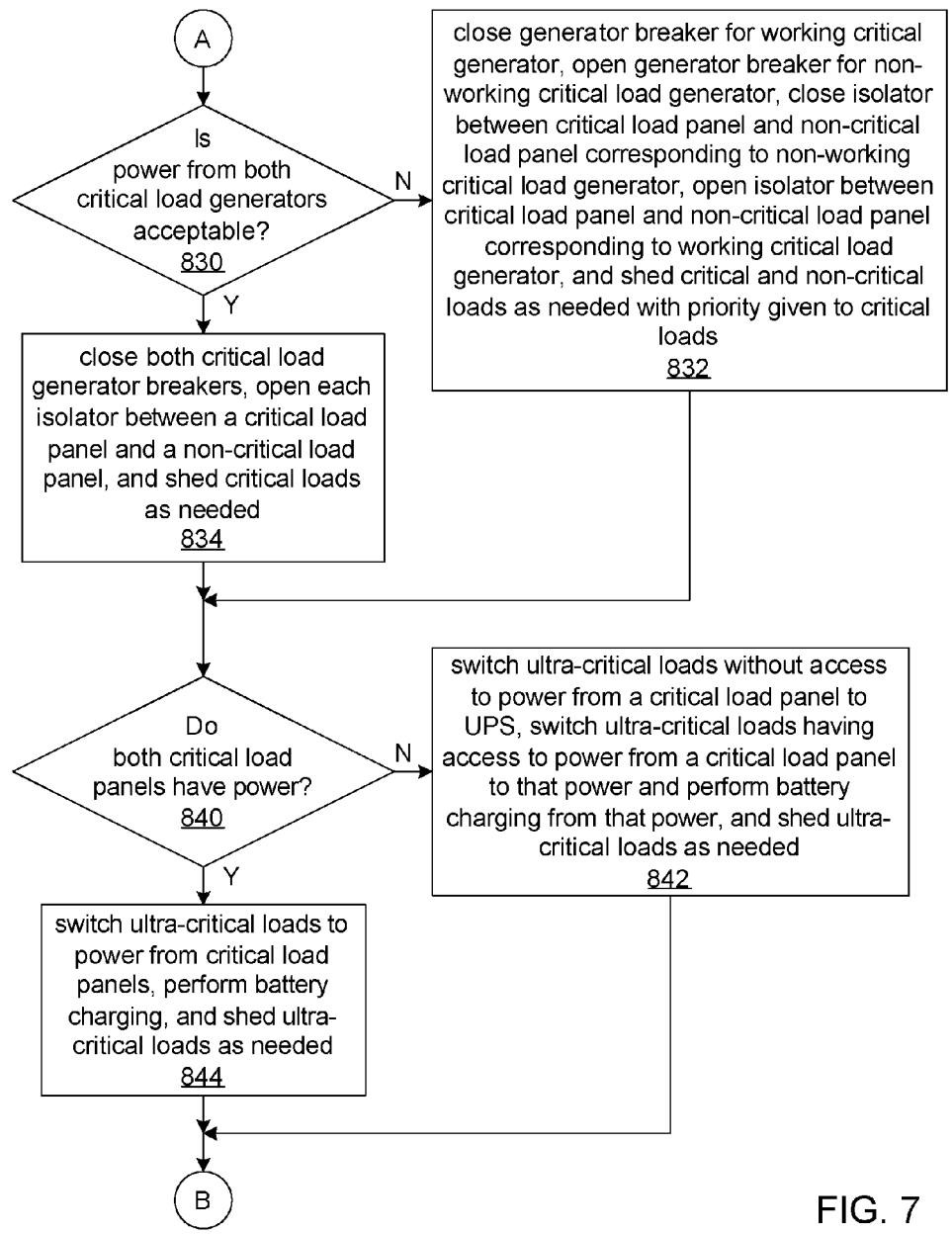
Figure 8:
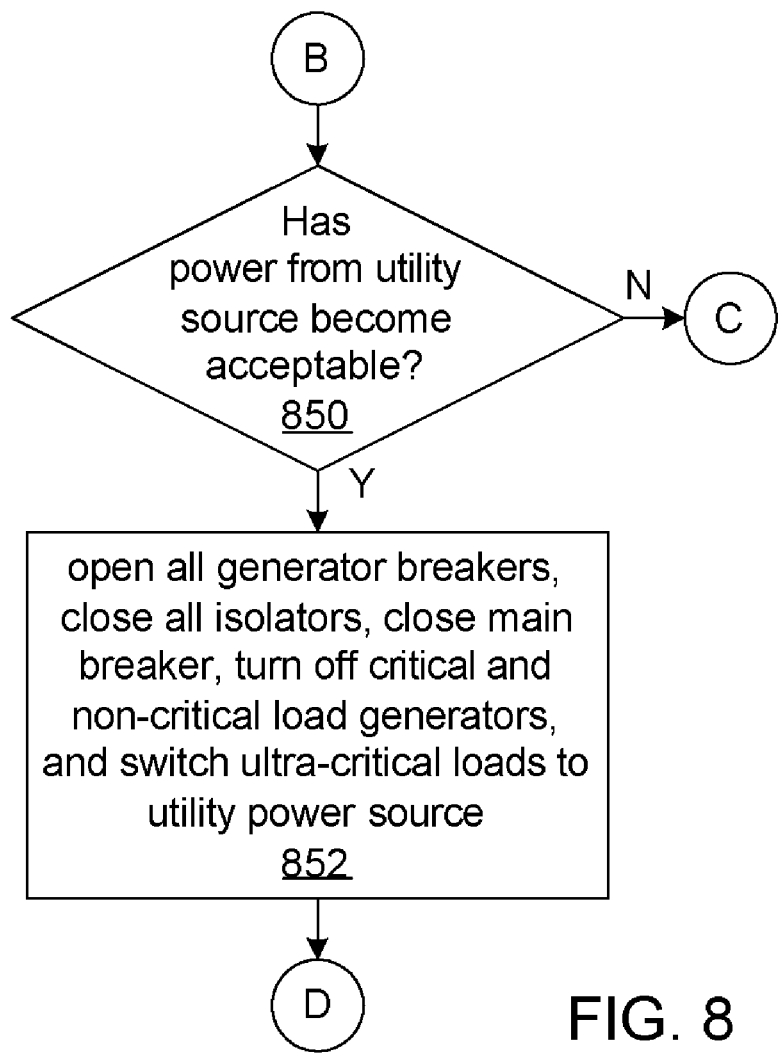

FIGS. 6, 7 and 8, together, show a procedure for supplying power to a critical load. At 810, the power from a utility power source is repeatedly checked to determine if it has become unacceptable. If so, then at 812, all ultra-critical loads are switched from receiving power from the utility power source to receiving power from uninterruptible power supplies, the main breaker by which power from the utility power source is routed to all loads is opened, an attempt is made to start all generator power sources (both the critical load generators and the non-critical load generators), all circuit isolators between distribution panels are opened, and all generator circuit breakers through which the generator power sources supply power to the distribution panels are closed.

If at 820, all non-critical load generators are supplying power, then at 824, all isolators between non-critical load distribution panels that are not already opened are opened, and all generator breakers through which the non-critical load generators provide power to the non-critical load distribution panels that are not already closed are closed. Also, non-critical loads are shed as needed to prevent the development of unsafe situations.

However, if at 820, one or more non-critical load generators are not able to supply power to their corresponding non-critical load distribution panels, then at 822, the generator breakers through which the non-working non-critical load generators would have provided power are opened, and the generator breakers through which working non-critical load generators will provide power are closed. To provide power to non-critical load distribution panels that would have been supplied with power by the non-working non-critical load generators, a circuit isolator between each of those non-critical load distribution panels and a non-critical load distribution panel being supplied with power by a working non-critical load generator is closed, while all other circuit isolators between non-critical load distribution panels are opened, as is also shown in FIG. 6 at 822. Also, non-critical loads are shed as needed to prevent exceeding the capacity of any of the working non-critical load generators providing power to more than one non-critical load distribution panel.

Continuing from either 822 or 824 FIG. 6, if at 830 of FIG. 7, all critical load generators are supplying power, then at 834, all generator breakers through which the critical load generators provide power to the critical load distribution panels that are not already closed are closed, and all isolators between non-critical load distribution panels and critical load distribution panels that are not already opened are opened. Also, critical loads are shed as needed to prevent the development of unsafe situations.

However, if at 830, one or more critical load generators are not able to supply power to their corresponding critical load distribution panels, then at 832, the generator breakers through which working critical load generators will provide power are closed, and the generator breakers through which the non-working critical load generators would have provided power are opened. To provide power to critical load distribution panels that would have been supplied with power by the non-working critical load generators, a circuit isolator between each of those critical load distribution panels and a non-critical load distribution panel is closed, while all other circuit isolators between critical load distribution panels and non-critical load distribution panels are opened. Also, critical and non-critical loads are shed as needed to prevent exceeding the capacity of any of the non-critical load generators providing power to a critical load distribution panel in addition to a non-critical load distribution panel, with priority given to providing power to the critical loads over the non-critical loads.

If at 840, all critical load distribution panels have power such that all ultra-critical loads are able to be provided with power from the critical load distribution panels, then at 844, all ultra-critical loads not already switched to the critical load distribution panels are switched to the critical load distribution panels, and battery charging is performed on all batteries otherwise used to supply power to the ultra-critical loads. Also, all ultra-critical loads are shed as needed to prevent the development of unsafe situations.

However, if at 840, one or more critical load distribution panels do not have power such that they are not able to supply power to ultra-critical loads of one or more ultra-critical load distribution panels corresponding to those critical load distribution panels, then at 842, those ultra-critical loads are switched to receiving power from an uninterruptible power supply. Other ultra-critical loads having access to critical load distribution panels that do have power are switched to those critical load distribution panels, and battery charging is performed on the batteries that would have provided power the ultra-critical loads now switched to the critical load distribution panels having power. Also, ultra-critical, critical and/or non-critical loads are shed as needed to prevent exceeding the capacity of any critical load or non-critical load generators providing power to the critical load distribution panels to which ultra-critical loads have been switched, with priority given to providing power to the ultra-critical loads over the critical and non-critical loads.

Continuing from either 842 or 844 of FIG. 7, if at 850 of FIG. 8, the power from the utility power source has not yet become acceptable, then a check of the power from all non-critical load generators is again made at 820 of FIG. 6. However, if at 850, the power from the utility power source has become acceptable, then at 852, all generator breakers are opened, all circuit isolators are closed, the main breaker is closed, all generator power sources are signaled to shut down, and the ultra-critical loads are switched to receiving power from the utility power source. Then, the power from the utility power source is again checked at 810 of FIG. 6.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A loadcenter for a first power source having a first status, a second power source having a second status, a third power source having a third status, a battery having a fourth status, a non-critical load, a critical load, and an ultra-critical load, said loadcenter comprising:
    a first distribution panel having a first circuit breaker to selectively receive power from the first power source;
    a second distribution panel having a second circuit breaker to selectively receive power from the second power source;
    a third distribution panel;
    a third circuit breaker to selectively supply power from the third power source to the first distribution panel;
    a fourth circuit breaker to selectively supply power from the first distribution panel to the non-critical load;
    a fifth circuit breaker to selectively supply power from the second distribution panel to the critical load;
    a sixth circuit breaker to selectively supply power from the third distribution panel to the ultra-critical load;
    a circuit isolator to selectively supply power from the first distribution panel to the second distribution panel;
    an uninterruptible power supply circuit structured to selectively receive power from one of the battery and the second distribution panel and to supply power to the third distribution panel; and
    a controller structured to monitor at least the second status and the third status, and in response to the second power source being unacceptable and the third power source being unacceptable, being further structured to:
        open the third circuit breaker;
        open the second circuit breaker;
        close the circuit isolator; and
        close the first circuit breaker.

2. The loadcenter of claim 1, wherein the fourth circuit breaker is structured to shed the non-critical load; wherein the fifth circuit breaker is structured to shed the critical load; and wherein the controller is further structured to signal at least one of the fourth circuit breaker to shed the non-critical load and the fifth circuit breaker to shed the critical load in response to the first power source providing power to both the first distribution panel and the second distribution panel.

3. The loadcenter of claim 2, wherein the controller is structured to monitor the amount of power drawn from the first power source, and to be programmable to shed one or more loads supplied with power from the first power source in response to the amount of power drawn from the first power source.

4. The loadcenter of claim 1, wherein the controller, in response to the third power source being unacceptable and the second power source being acceptable, is further structured to:
   open the third circuit breaker;
   open the circuit isolator;
   close the first circuit breaker; and
   close the second circuit breaker.

5. The loadcenter of claim 4, wherein the controller is further structured to monitor the amount of power drawn from the second power source, and to be programmable to shed one or more loads supplied with power from the second power source in response to the amount of power drawn from the second power source.

6. The loadcenter of claim 1, wherein the first and second power sources are generator power sources, and wherein the controller is further structured to be programmable with data concerning the power output capacity of the first power source and the second power source.

7. The loadcenter of claim 1, wherein the uninterruptible power supply circuit is structured to recharge the battery in response to the second distribution panel having power.

8. The loadcenter of claim 7, wherein the uninterruptible power supply circuit is further structured to monitor the fourth status and cease drawing power from the battery in response to the battery being depleted to a predetermined level.

9. The loadcenter of claim 7, wherein the uninterruptible power supply circuit is further structured to monitor the fourth status and cease supplying power to the third distribution panel in response to the battery being depleted to a predetermined level and the second distribution panel having no power.

10. A loadcenter for a first power source having a first status, a second power source having a second status, a third power source having a third status, a fourth power source having a fourth status, a fifth power source having a fifth status, a first non-critical load, a second non-critical load, a first critical load and a second critical load, said loadcenter comprising:
   a first distribution panel having a first circuit breaker to selectively receive power from the first power source;
   a second distribution panel having a second circuit breaker to selectively receive power from the second power source;
   a third distribution panel having a third circuit breaker to selectively receive power from the third power source;
   a fourth distribution panel having a fourth circuit breaker to selectively receive power from the second power source;
   a fifth circuit breaker to selectively supply power from the fifth power source to the first distribution panel;
   a first circuit isolator to selectively supply power from the first distribution panel to the second distribution panel;
   a second circuit isolator to selectively supply power from the first distribution panel to the third distribution panel;
   a third circuit isolator to selectively supply power from the third distribution panel to the fourth distribution panel;
   a sixth circuit breaker to selectively supply power from the first distribution panel to the first non-critical load;
   a seventh circuit breaker to selectively supply power from the second distribution panel to the first critical load;
   an eighth circuit breaker to selectively supply power from the third distribution panel to the second non-critical load;
   a ninth circuit breaker to selectively supply power from the fourth distribution panel to the second critical load;
   a controller structured to monitor at least the first status, the third status and the fifth status, and in response to the third power source being unacceptable and the fifth power source being unacceptable, being further structured to:
      open the fifth circuit breaker;
      open the third circuit breaker;
      close the first circuit breaker; and
      close the second circuit isolator.

11. The loadcenter of claim 10, wherein the sixth circuit breaker is structured to shed the first non-critical load, wherein the eighth circuit breaker is structured to shed the second non-critical load, and wherein the controller is further structured to signal at least one of the sixth circuit breaker to shed the first non-critical load and the eighth circuit breaker to shed the second non-critical load in response to the first power source providing power to both the first distribution panel and the third distribution panel.

12. The loadcenter of claim 11, wherein the controller is further structured to monitor the amount of power drawn from the first power source, and to be programmable to shed one or more loads supplied with power from the first power source in response to the amount of power drawn from the first power source.

13. The loadcenter of claim 10, wherein the controller, in response to the first power source being unacceptable and the fifth power source being unacceptable, is further structured to:
   open the fifth circuit breaker;
   open the first circuit breaker;
   close the third circuit breaker; and
   close the second circuit isolator.

14. The loadcenter of claim 13, wherein the sixth circuit breaker is structured to shed the first non-critical load; wherein the eighth circuit breaker is structured to shed the second non-critical load; and wherein the controller is further structured to signal at least one of the sixth circuit breaker to shed the first non-critical load and the eighth circuit breaker to shed the second non-critical load in response to the third power source providing power to both the first distribution panel and the third distribution panel.

15. The loadcenter of claim 14, wherein the controller is further structured to monitor the amount of power drawn from the third power source, and to be programmable to shed one or more loads supplied with power from the third power source in response to the amount of power drawn from the third power source.

16. The loadcenter of claim 10, wherein the controller, in response to the fifth power source being unacceptable and the second power source being acceptable, is further structured to:
   open the fifth circuit breaker;
   open the first circuit isolator; and
   close the second circuit breaker.

17. The loadcenter of claim 10, wherein the first, second, third and fourth power sources are generator power sources, and wherein the controller is further structured to be programmable with data concerning the power output capacity of the first, second, third and fourth power sources.

18. The loadcenter of claim 17, wherein the data includes a predetermined level of current usage of power supplied by at least one of the first, second, third and fourth power sources at which the shedding of at least one load is triggered.

19. The loadcenter of claim 10, wherein the first, second and third circuit isolators are contactors.

20. A loadcenter for a first power source having a first status, a second power source having a second status, a third power source having a third status, a fourth power source having a fourth status, a fifth power source having a fifth status, a first battery having a sixth status, a second battery having a seventh status, a first non-critical load, a second non-critical load, a first critical load, a second critical load, a first ultra-critical load and a second ultra-critical load, said loadcenter comprising:

a first distribution panel having a first circuit breaker to selectively receive power from the first power source;

a second distribution panel having a second circuit breaker to selectively receive power from the second power source;

a third distribution panel having a third circuit breaker to selectively receive power from the third power source;

a fourth distribution panel having a fourth circuit breaker to selectively receive power from the fourth power source;

a fifth distribution panel;

a sixth distribution panel;

a fifth circuit breaker to selectively supply power from the fifth power source to the first distribution panel;

a first circuit isolator to selectively supply power from the first distribution panel to the second distribution panel;

a second circuit isolator to selectively supply power from the first distribution panel to the third distribution panel;

a third circuit isolator to selectively supply power from the third distribution panel to the fourth distribution panel;

a sixth circuit breaker to selectively supply power from the first distribution panel to the first non-critical load;

a seventh circuit breaker to selectively supply power from the second distribution panel to the first critical load;

an eighth circuit breaker to selectively supply power from the third distribution panel to the second non-critical load;

a ninth circuit breaker to selectively supply power from the fourth distribution panel to the second critical load;

a tenth circuit breaker to selectively supply power from the fifth distribution panel to the first ultra-critical load;

an eleventh circuit breaker to selectively supply power from the sixth distribution panel to the second ultra-critical load;

a first uninterruptible power supply circuit structured to selectively receive power from one of the first battery and the second distribution panel and to supply power to the fifth distribution panel;

a second uninterruptible power supply circuit structured to selectively receive power from one of the second battery and the fourth distribution panel and to supply power to the sixth distribution panel; and a controller structured to monitor at least the second status and the fifth status, and in response to the second power source being unacceptable and the fifth power source being unacceptable, being further structured to:
open the fifth circuit breaker;
open the second circuit breaker;
close the first circuit isolator; and
close the first circuit breaker.

21. The loadcenter of claim 20, wherein the controller is further structured to monitor the first status and the third status, and in response to the first power source being unacceptable, the second power source being unacceptable, the third power source being unacceptable and the fifth power source being unacceptable, being further structured to:
open the fifth circuit breaker;
open the first circuit breaker;
open the second circuit breaker;
open the third circuit breaker;
close the first circuit isolator;
close the second circuit isolator;
close the third circuit isolator; and
close the fourth circuit breaker.

22. The loadcenter of claim 21, wherein the controller is further structured to monitor the amount of power drawn from the fourth power source, and to be programmable to shed one or more of the first non-critical load, the second non-critical load, the first critical load and the second critical load in response to the amount of power drawn from the fourth power source.

* * * * *